United States Patent [19]
Kisaki et al.

[11] 3,917,676
[45] Nov. 4, 1975

[54] PROCESS FOR PRODUCING ALLYLACETATE
[75] Inventors: Hisashi Kisaki; Yukihiro Tsutsumi; Koshuke Takeshige, all of Shin Nanyo, Japan
[73] Assignee: Toyo Soda Manufacturing Co., Ltd., Yamaguchi, Japan
[22] Filed: Nov. 6, 1973
[21] Appl. No.: 413,198

Related U.S. Application Data
[63] Continuation-in-part of Ser. No. 214,410, Dec. 30, 1971, abandoned.

[30] Foreign Application Priority Data
Dec. 30, 1970  Japan.............................. 45-126775

[52] U.S. Cl.............. 260/497 A; 253/432; 253/457; 253/466 PT; 253/473
[51] Int. Cl.$^2$.................. C07C 67/05; C07C 69/155
[58] Field of Search............................... 260/497 A

[56] References Cited
UNITED STATES PATENTS
3,275,680   9/1966   Holzrichter et al............. 260/497 A
3,631,079   12/1971  Sennewald et al.............. 260/497 A FOREIGN PATENTS OR APPLICATIONS
1,901,289   9/1970   Germany........................ 260/497 A Primary Examiner—Robert Gerstl
Assistant Examiner—Richard D. Kelly
Attorney, Agent, or Firm—Oblon, Fisher, Spivak, McClelland & Maier

[57] ABSTRACT

Allylacetate is produced by reacting propylene with acetic acid and oxygen or air, in vapor phase, in the presence of a catalytic amount of the combination of a palladium metal, a lead metal and an alkaline or alkaline earth metal carboxylate. The palladium and lead can be produced in situ by reduction of compounds thereof with a reducing agent, e.g., hydrogen gas.

9 Claims, No Drawings

PROCESS FOR PRODUCING ALLYLACETATE

RELATIONSHIP TO PREVIOUS APPLICATIONS

This is a Continuation-In-Part application of U.S. Patent application Ser. No. 214,410, filed Dec. 30, 1971, of the same title, and now abandoned.

BACKGROUND OF THE INVENTION

1. Field of the Invention

This invention relates to the process for producing allylacetate from propylene in the vapor phase.

2. Description of the Prior Art

In the prior art, allylacetate has been produced from propylene, acetic acid and oxygen or air in the vapor phase, using palladium metal or a supported palladium metal salt as the catalyst. Alkali or alkaline earth metal acetate have also been added to this catalyst system as a catalysis promoter.

However, the use of a supported palladium catalyst alone, has been shown to provide a very low space-time yield of allylacetate, and at relatively low formation rates, so that its use has not resulted in an industrially acceptable reaction.

Even when a promoter is used, such as in amounts of from 0.1 – 10 percent by weight of palladium metal and 1 – 20 percent by weight of alkali or alkaline earth metal acetate, the space-time yield, or the catalytic effect per liter of the catalyst, per hour of allylacetate, is 44 – 61 grams and the yield of allylacetate per gram of palladium metal per hour will not exceed 2 – 3 grams. The selectivity for allylacetate in this case is 86 – 89 percent, the rest being essentially carbon dioxide.

These results show that the catalytic effect of the catalyst is extremely small, while the formation of carbon dioxide gas due to complete combustion is great, so that the yield of allylacetate is inadequate. Moreover, considering that palladium metal is rather expensive, it is far from satisfactory as an industrial process for producing allylacetate.

SUMMARY OF THE INVENTION

Accordingly, it is one object of this invention to provide a catalyst system for producing allylacetate in good yields and at a high rate of formation.

It is another object of this invention to provide a catalyst system for producing allylacetate with a less expensive catalyst system than previously required.

These and other objects, as will hereinafter become more readily apparent, have been attained by the vapor phase reaction synthesis of allylacetate by catalytic oxidation using lead as a promoter in combination with an alkali or alkaline earth metal carboxylate, for a supported palladium or palladium metal salt. The reaction proceeds with high activity and high selectivity for the allylacetate.

DETAILED DESCRIPTION OF THE PREFERRED EMBODIMENTS

According to this invention, allylacetate is produced by contacting a mixed gas of propylene and oxygen or air, with a catalyst composed of palladium metal as the main component, and lead and alkali or alkaline earth metal carboxylate as promotors, supported on a carrier.

A notable feature of the catalyst of this invention is that it shows very high catalytic activity. In one Example, the space time yield of allylacetate reached 180 grams per liter of catalyst per hour, using only 1.5 percent by weight of palladium metal. When the lead metal and carboxylate were added as promoters, the amount of allylacetate produced per gram of palladium metal per hour exceeded 13 grams, which is an amazing result. This is by far a much higher productivity of allylacetate, as compared with other processes and, moreover, the activity of the catalyst of this invention lasts for a longer period of time which considerably enhances its industrial value.

In similar reactions using homologous olefins, such as in the synthesis of vinyl acetate from ethylene, wherein palladium metal is used as the main catalyst, such as in British Pat. No. 1,209,125, carbon dioxide gas, caused by the combustion of the olefin with acetic acid, is produced as a side reaction. The formation of $CO_2$ increases as the activity of the catalyst and the reaction temperature increases. This has made it difficult, in practice, to start with a reaction temperature of over 150° – 160°C, which is one of the main reasons for the comparatively low rate of formation of the desired product in the prior art reactions.

Such difficulties can easily be resolved by the use of the catalyst of this invention. This catalyst has particularly strong effect in suppressing the formation of carbon dioxide gas by combustion, to less than 10 percent based on the reacted olefin. Accordingly, the degree of formation of the allylacetate can be increased by raising the reaction temperature without fear of accelerating the undesirable side reactions. This makes the process of this invention decidedly advantageous as compared with conventional prior art processes.

Other byproducts, such as acetone, acrolein, isopropyl acetate and diesters are also produced in the prior art processes, in addition to carbon dioxide, but these liquid byproducts can be held down to below 3 percent, even when the conversion of the reactant propylene is increased.

The catalyst of this invention therefore enables a very high formation of allylacetate, making it possible to obtain yields of over 90 percent.

In carrying out the process of this invention, although it is advantageous to use pure propylene as the reactant, the presence of lower saturated hydrocarbons, such as methane, ethane and propane, as contaminants is not objectionable.

Impurities such as acetaldehyde or water, in the acetic acid used as a reactant in the process of this invention, is also permissible. However, it is preferred to use concentrated acetic acid and most preferably glacial acetic acid.

The oxygen can be supplied in pure form or may be diluted with an inert gas, such as nitrogen or carbon dioxide, for example, in the form of air. When the reaction gas is re-circulated, it is desirable to use oxygen in a high concentration form of over 99 percent.

The quantity ratio of propylene and oxygen gases should be within the explosive range, and oxygen is preferably present in an amount of 1 – 40 percent, preferably 10 – 30 percent in volume.

There is no criticality in the quantities of acetic acid and propylene used. However, since the combustion reaction tends to increase when the quantity of acetic acid is too small, the molar ratio should be in the range of 1 : 10 – 10 : 1, and more preferably 0.1 – 2.0 : 1.0.

The space time velocity of the reactant gases may be within the range of 100 – 3,000 liters (standard conditions)/catalytic liter hour.

The catalyst employed in the process of this invention comprises 0.01 – 10.0 percent, preferably 0.5 – 5.0 percent by weight of palladium metal based on the carrier, 0.01 – 20.0 percent, preferably 0.5 – 10.0 percent by weight of lead metal as metallic lead, and 0.01 – 30 percent, preferably 1.0 – 20.0 percent by weight of alkali or alkaline earth metal carboxylate, supported on the carrier.

Palladium metal can advantageously be obtained by reduction of a palladium salt, for example, palladium chloride, nitrate, acetate or the like, in contact with the catalyst carrier.

Metallic lead can easily be produced from lead salt, similarly to palladium metal, i.e., from the corresponding nitrate, chloride, oxide, acetate or the like, using a reducing agent, e.g., introducing hydrogen gas at elevated temperatures.

Suitable alkali or alkaline earth metal carboxylates include lithium, potassium, sodium, calcium, magnesium or barium. Sodium carbonate, potassium carbonate, sodium borate, etc., or basic compounds of alkali or alkaline earth metals which can be converted into the acetate on the carrier immediately after the introduction of the mixed reaction gas can also be used.

The carboxylate reactant may contain from 1 – 4 carbon atoms, such as the propionate, which can be converted into the acetate by introduction of the reaction gas containing acetic acid.

Suitable carriers include alumina, silica gel, silica-alumina, aluminum phosphate, activated carbon, silicon carbide, pumice, and diatomaceous earth, etc., may be used. Activated alumina and activated carbon, in particular, provide very high activity catalysts.

The catalyst of this invention may be prepared by conventionally known methods. For instance, palladium and lead may be supported simultaneously or alternately on a carrier composed of one or more of the foregoing substances by co-precipitation. In one instance, the carrier may be, for example, impregnated with an aqueous solution of mixed salts of palladium and lead. The solution is then evaporated to dryness, and sintered in air. It is then subjected to hydrogen reduction, or treated with other reducing agents.

Alternatively, the aqueous solution of palladium salt may be used to impregnate a carrier, evaporated to dryness, sintered and reduced, and then an aqueous solution of a lead salt is impregnated onto the previously palladium-impregnated carrier and similarly treated.

The alkali or alkaline earth metal carboxylate can be supported by impregnating the carrier supporting the palladium and the lead or lead compound, with an aqueous solution of the carboxylate which is evaporated to dryness in the same manner as above.

Simultaneous supporting of lead and alkali or alkaline earth metal carboxylate on the carrier with palladium metal is also quite possible.

Of course, the particular manner of supporting the catalyst is not critical and should be selected only on the basis of convenience.

The reaction proceeds to some extent at a temperature of 100°C, preferably from 120° to 300°C, more preferably 150° to 250°C. The rate of allylacetate formation will increase as the temperature is increased. As the temperature increases, however, the extent of side reactions increases and larger quantities of carbon dioxide gas, acetone and acrolein are produced.

The reaction pressure is not critical, except that it should be such that at the reaction temperature the reactants are maintained in the gaseous state, normally it is selected in the range of 0 – 5 Kg/cm$^2$ G(1 – 6 atm.) depending on reaction conditions.

In carrying out the process of this invention, the reaction apparatus may be a fluid bed or a fixed bed, depending on the shape of the catalyst and the performance of the reaction.

The following Examples further illustrate the process of the present invention, but the said reaction is not limited to the combination of propylene and acetic acid only, but is effective also for any optional combination of olefin and carboxylic acid.

EXAMPLE 1

3.3 grams of palladium nitrate and 2.4 grams of lead nitrate were added and dissolved in 250 mls of aqueous solution containing 5 grams of concentrated nitric acid. To this aqueous solution 100 grams of 4 – 5 mesh spherical activated alumina as carrier was introduced, and then evaporated to dryness in a water bath. After drying, it was sintered in air at 250°C for five hours and subjected to hydrogen reduction at 200°C for five hours. The reduced catalyst was placed into 150 mls of aqueous solution containing 5.0 grams of sodium acetate, and evaporated to dryness.

20 grams of the catalyst prepared in this way were placed into a glass reaction tube with an inside diameter of 30 mm and the raw material gases of propylene, oxygen and acetic acid of the molar ratio of 5:2:5 were introduced into the catalyst layer which was maintained at 200°C at a flow rate of 10 liters (at atmospheric pressure) per hour. Analysis of the gas produced by gas chromatography showed the space time yield of allylacetate to be 180 grams/catalytic liter·hr, corresponding to 13.9 grams./hr. per 1 gram of palladium metal. The selectivity for allylacetate was 93.8 percent, carbon dioxide 5.1 percent and the remainder was 1.1 percent of liquid product of acetone and diesters, or the like.

A continuous experiment conducted for about a month showed little deterioration in the activity of the catalyst.

COMPARATIVE EXAMPLES 1 – 4

The following comparative examples are given in order to make the effects of the catalyst of Example 1 clearer.

The reaction in each of the Comparative Examples was conducted under similar conditions as in Example 1, and the catalyst components (in each case supported on a carrier) used in the Comparative Examples were as follows:

In Comparative Example 1, only palladium metal in the same amount as in Example 1; in Comparative Example 2, the same amount of palladium metal and sodium acetated as in Example 1; in Comparative Example 3, palladium metal, and sodium acetate in an equivalent amount to the total molar number of sodium acetate and lead in Example 1; and in Comparative Example 4, the same amount each of palladium metal and lead as in Example 1, respectively.

The carrier and the method of supporting each of the catalyst components were the same as Example 1.

The results of these experiments are shown in Table I. From these, it should be quite clear that the advantages of this invention are only attained when using the ternary components, and that the effect of suppression of the combustion by lead is very great.

TABLE I

| Catalyst | (wt. %) | Space time yield (g/l·hr) | Selectivity Allylacetate | (%) Carbon dioxide |
|---|---|---|---|---|
| Example 1 — Pd | 1.5 | 180 | 93.8 | 5.1 |
|   CH$_3$COONa | 5.0 | | | |
| Comparative Example 1 — Pd | 1.5 | 1.7 | 5.4 | 90.4 |
| Comparative Example 2 — Pd | 1.5 | 38.0 | 59.6 | 38.9 |
|   CH$_3$COONa | 5.6 | | | |
| Comparative Example 3 — Pd | 1.5 | 39.5 | 60.8 | 38.0 |
|   CH$_3$COONa | 5.6 | | | |
| Comparative Example 4 — Pd | 1.5 | 10.6 | 65.2 | 29.8 |
|   Pb | 1.5 | | | |

1) Content of each component in the catalyst is based on the carrier. In addition, lead is calculated as lead metal.

EXAMPLE 2

3.3 grams of palladium chloride was added and dissolved in 200 mls of an aqueous solution containing 3 grams of concentrated hydrochloric acid. To this aqueous solution 100 grams of the same carrier as in Example 1 was placed into the reactor and evaporated to dryness in a water bath. This was placed slowly into a reduction liquor composed of 10 grams of 80 percent hydrazine hydrate liquor, and 100 mls. of an aqueous solution of 1 N caustic soda and reduced. The reduced palladium metal, supported on the carrier, was washed thoroughly in water and then placed into 100 mls. of water containing 4.8 grams of lead nitrate and evaporated to dryness and the catalyst was reduced with hydrogen at 200°C for five hours and washed with distilled water. Then, 6 grams of potassium acetate was added to be supported by the carrier as in Example 1 and dried.

20 grams of the catalyst prepared in this way was placed into a reaction tube similar to that used in Example 1, and the raw material gases of propylene, oxygen and acetic acid in a molar ratio of 4:1:2 were introduced into the catalyst layer which was maintained at 180°C at a flow rate of 16 liters (at atmospheric pressure) per hour. The space time yield of allylacetate was 133 grams/catalytic liter·hr. The selectivity for allylacetate was 96 percent and the formation of carbon dioxide gas was 3.7 percent.

EXAMPLE 3

1.7 grams of palladium chloride was added and dissolved in 200 mls. of 5 percent ammonium of aqueous solution. Spherical activated alumina was added to this aqueous solution as in Example 1 and evaporated to dryness. After drying, it was reduced with hydrogen for 5 hours. The reduced palladium supported on a carrier was placed into 200 mls. of an aqueous solution containing 7.2 grams of lead nitrate and evaporated to dryness and then sintered in air at 250°C for five hours. 17 grams of sodium tetraborate was supported on the carrier as in Example 1 and dried.

5 grams of the catalyst prepared in this way was placed into a reaction tube, as in Example 1, and the reactant gases of propylene, oxygen and acetic acid of the molar ratio of 9:1:3 were introduced through the catalyst layer, which was maintained at 250°C. The flow rate of the gases was 9 liters (at atmospheric pressure) per hour.

The space time yield of allylacetate was 90 grams/catalyst liter·hr and selectivity for allylacetate was 86.0 percent and carbon dioxide was 9.5 percent.

EXAMPLE 4

10.8 grams of palladium nitrate and 12.8 grams lead nitrate were supported on 100 grams of 4 to 5 mesh of spherical activated alumina, as in Example 1 and sintered in air and reduced with hydrogen. Then, 10 grams of sodium propionate was supported on the carrier and dried.

10 grams of this catalyst was placed into the same reaction tube as Example 1, and the reactant gases of propylene, oxygen and acetic acid in a molar ratio of 6:1:4 were introduced into the catalyst layer which was maintained at 120°C, and a flow rate of 6 liters (at atmospheric pressure) per hour.

The space time yield of allylacetate was 100 grams/catalytic liter·hr. The selectivity for allylacetate was 97.2 percent and for carbon dioxide was 2.4 percent.

EXAMPLE 5

1.6 grams of lead nitrate was added and dissolved in 250 mls of an aqueous solution containing 5 grams of concentrated nitric acid. To this aqueous solution, 100 grams of spherical activated alumina as in Example 1, was added, and evaporated to dryness in a water bath as in Example 1. Then, it was placed into an aqueous solution containing 1.7 grams of sodium tetrachloropalladate (II) and evaporated to dryness. Immediately afterwards, the catalyst was reduced with hydrogen at 200°C for five hours and washed with distilled water until no chloride was detected. Then the mixture of 5 grams of sodium acetate and 6 grams of potassium acetate was supported on the carrier.

10 grams of the catalyst prepared in this manner was placed into a reaction tube and the reaction gases of propylene, oxygen and acetic acid in a molar ration of 12:1:3 were introduced through the catalyst layer, maintained at 160°C. The flow rate was 10 liters (at a pressure of 3 kg/cm$^2$G) per hour. The space time yield of allylacetate was 175 grams/catalyst liter·hr. The selectivity for allylacetate was 96.5 percent and for carbon dioxide was 2.2 percent.

EXAMPLE 6

Reaction conditions:
Same as Example 5 except for reaction pressure

| | Allylacetate | | CO$_2$ |
|---|---|---|---|
| | STY (g/cat·l·hr) | Selectivity (%) | Selectivity |
| 0 Kg/cm$^2$G (1 atm) | 45 | 97.0 | 1.8 |
| 2 Kg/cm$^2$G (3 atm) | 120 | 96.6 | 2.0 |
| 4 Kg/cm$^2$G (5 atm) | 220 | 95.0 | 3.2 |

Having now fully described the invention, it will be apparent to one of ordinary skill in the art that many changes and modifications can be made thereto without departing from the spirit or scope of the invention.

What is claimed as new and intended to be covered by Letters Patent is:

1. A process for producing allylacetate which comprises reacting propylene with acetic acid and oxygen in the vapor phase in the presence of a ternary catalyst system consisting essentially of
   a. 0.01 to 10.0 weight percent based on the weight of the carrier, of palladium metal b. 0.01 to 20.0 weight percent based on the weight of the carrier, of lead metal c. 0.01 to 30.0 weight percent based on the carrier of alkali or alkaline earth metal salts selected from the group consisting of carboxylate having 1 – 4 carbon atoms, carbonate and borate, wherein the reaction temperature is from 100° to 300°C and the reaction pressure is sufficient to maintain the reactants and products in the gaseous phase.

2. The process according to claim 1, wherein the palladium metal is obtained by reducing a compound selected from palladium salts consisting of palladium chloride, nitrate and acetate.

3. The process according to claim 1, wherein the alkali or alkaline earth metal carboxylate is acetate, propionate or butyrate.

4. The process according to claim 1, wherein the alkali or alkaline earth metal carboxylate is alkali or alkaline earth metal carbonate or borate.

5. The process according to claim 1, wherein the alkali metal is lithium, sodium, or potassium.

6. The process according to claim 1, wherein the alkaline earth metal is magnesium.

7. The process according to claim 1, wherein the carrier is alumina, silica gel, silica-alumina, aluminum phosphate, activated carbon, silicon-carbide, pumice or diatomaceous earth.

8. The process according to claim 1, wherein the reaction temperature is from 100° to 300°C.

9. The process according to claim 1, wherein the reaction pressure is sufficient to maintain the reactants and products in the gaseous phase, said pressure being in the range of 0 – 5 kg/cm$^2$.

* * * * *